United States Patent Office 2,699,801
Patented Jan. 18, 1955

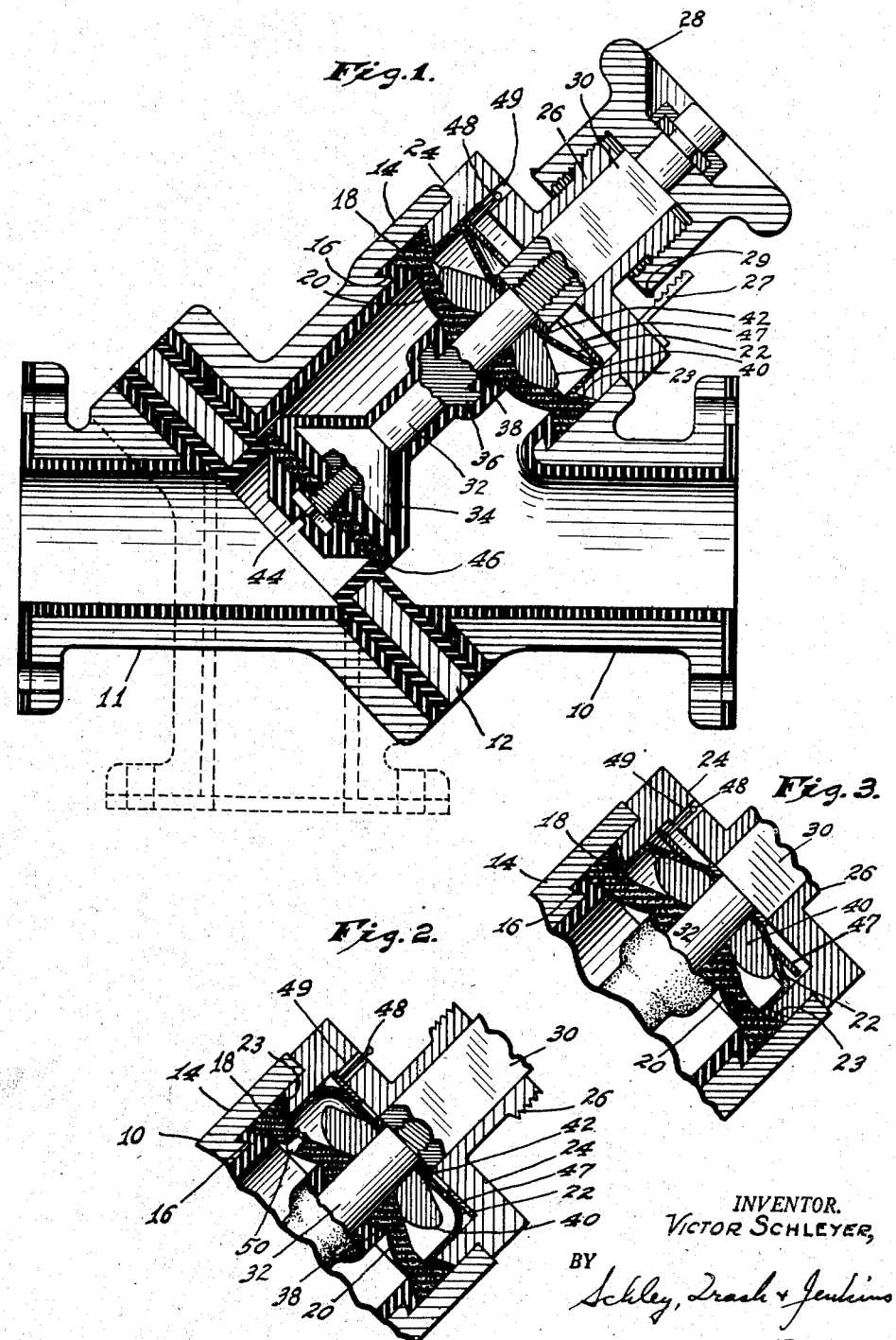

2,699,801

PACKINGLESS VALVE WITH SECONDARY SEAL AND FAILURE INDICATOR

Victor Schleyer, Anderson, Ind.

Application October 20, 1949, Serial No. 122,499

2 Claims. (Cl. 137—553)

This invention relates to a packingless, removable-seat valve, and valve-sealing diaphragm structure for a packingless valve in which the valve stem is sealed to the valve body by a flexible primary diaphragm seal supplemented by a secondary sealing means with which may be associated an indicator operable thereby to give an externally visible indication in the event of failure of the primary diaphragm.

A primary object of my invention is to supplement the primary diaphragm of a packingless valve with a secondary seal, preferably in the form of a secondary diaphragm. A further object is to provide an indicator operable by the secondary seal to move to an externally visible warning position in the event of failure of the primary diaphragm. Another object of the invention is to provide a packingless valve in which the valve seat is formed by a flat plate removably secured between separable parts of the valve body, so that such valve seat may be reversed or replaced to renew the valve seat. A further object of the invention is to provide a packingless removable-seat valve which is lined with a lining material, such as natural or artificial rubber materials which are not affected by the medium which the valve is to carry. A further object of the invention is to provide a valve in which the proportion of valve opening is effectively indicated.

The accompanying drawing illustrates my invention. In such drawing, Fig. 1 is a longitudinal section of a valve embodying my improvements, showing the valve in closed position, and showing in dotted lines an alternative relative position of the two main valve-body parts; Fig. 2 is a fragmentary section taken in the same plane as Fig. 1, showing the valve stem in fully open position, and showing a leakage-indicating position of the supplementary diaphragm and the indicator mechanism; and Fig. 3 is a view similar to Fig. 2, showing the secondary diaphragm and indicator in normal position at fully open position of the valve.

The valve shown in the accompanying drawing comprises two body parts 10 and 11 clamped together against the opposite faces of a valve-seat plate 12. The valve seat plate 12 and the adjoining flanges of the body parts 10 and 11 are disposed at a 45° angle with respect to the axes of the body parts, both for cooperation with the valve mechanism and to permit the body member 11 to be connected to the other parts either coaxially with the body part 10, as shown in full lines in Fig. 1, or at right angles thereto, as shown in dotted lines in Fig. 1. The two body parts 10 and 11 and the valve seat plate 12 are clamped together by bolts (not shown) extending through the flanges and desirably arranged symmetrically about the axis of the valve seat plate 12 to permit the body member 11 to be disposed in either of its alternative positions.

The valve body member 10 is provided with a tubular branch or sleeve 14 coaxial with the central opening of the valve seat plate 12 and hence at a 45° angle to the axis of the main passage of the body member 10, to receive and support the valve plug mechanism. Such sleeve 14 is provided internally with an undercut shoulder forming a frusto-conical seat 16 to receive the enlarged rim 18 of the main diaphragm 20. A supplementary diaphragm 22, generally of hat section, lies with its rim 23 against the upper face of the rim 18 of the primary diaphragm. The two diaphragms are clamped in place by means of a yoke 24 received in and secured to the sleeve 14, as by exterior clamp bolts (not shown).

The yoke 24 has an externally threaded neck 26 to receive an internally threaded handle 28, and such neck 26 is provided with a central, non-circular hole, conveniently square in cross section, to receive a slidable valve stem 30 to which the handle 28 is rotatably attached. The inner end of the stem 30 is provided with an internally threaded hole to receive the threaded end of the shank 32 of the valve plug member 34. Intermediate its length, the shank 32 carries a flange 36 forming an undercut frusto-conical shoulder which receives the thickened inner rim 38 of the main diaphragm 20. A diaphragm supporting ring 40 lies against the opposite side of the inner rim 38 of the diaphragm 20 and is formed to provide support for that primary diaphragm substantially throughout its stroke. The inner edge of the supplementary diaphragm 22 lies between the rear face of the ring 40 and a washer 42, and the diaphragm assembly is clamped between the flange 36 and the stem 30.

The valve plug 34 is of conical form, with a flat lower end, which is provided with a central threaded opening to receive a screw 44 which clamps a valve facing disk 46 against the flat end of the valve body 34.

With the valve in closed position, the supplementary diaphragm 22 has a normal configuration as shown in Fig. 1, and includes a generally cylindrical wall extending from its rim 23 upward inside the wall of the yoke, and a generally radial portion which is spaced from the upper inner face of the yoke 24 and is flexed downward. An indicator operating ring 47 is disposed within the yoke, resting on the supplementary diaphragm. This ring 47 loosely fits within the walls of the yoke 24 for guidance thereby, and its web extends only part way toward the valve stem 30, to leave a large central hole providing clearance for movement of the central portion of the supplementary diaphragm 22. The ring 47 carries an indicator pin 48 which projects upwardly into a hole 49 through the radial end wall of the yoke 24. Normally, the indicator pin 48 lies with its head depressed below the outer end of the hole 49, and hence out of sight.

As the valve is opened from the closed position shown in Fig. 1 to the fully open position shown in Fig. 3, the radial portion of the supplementary diaphragm 22 flexes upward and its central portion rises through the large central opening of the indicator ring 47, to the position shown in Fig. 3. While this may raise the indicator ring 47 slightly, the resulting movement of the indicator pin 48 is insufficient to carry the head of that pin outward beyond the end of the hole 49 in which it lies.

The supplementary diaphragm 22 is flexible and desirably is distendable. Normally, it is protected by the main diaphragm from pressure within the valve, and hence is normally under no pressure tending to cause it to depart from its normal configuration, or to lift the indicator ring. In the event of failure of the primary diaphragm, as by rupture indicated at 50 in Fig. 2, pressure within the valve body escapes through the primary diaphragm 20 and is exerted on the secondary diaphragm. Such pressure forces the supplementary diaphragm 22 upward, distending it against the confining walls of the yoke 24, where it is supported to seal the valve despite the failure of the primary diaphragm. In addition, when the valve includes an indicator as shown, the deformation of the supplementary diaphragm lifts the indicator ring 47 against the end face of the yoke 24, as shown in Fig. 2, to project the indicator pin 48 outward beyond the outer face of the yoke 24, where it gives a readily observable indication that the primary diaphragm has failed and needs replacement.

The valve body and seat construction as described above fixes the position of the valve seat with respect to the main body part 10, since such position is predetermined by the face of the main body part 10 against which the valve-seat plate is secured; and the relationship remains fixed regardless of repeated renewals and replacements of the valve seat. The opening of the valve is proportional to the amount of opening movement of the handle 28. To indicate the position of the handle, and hence the proportional opening of the valve, I provide the handle with a ridge 29, conveniently about its lower end, and dispose adjacent thereto a fixed scale piece 27 having scale pointers at the extreme positions of the handle movement and one or more scale pointers at intermediate points.

The valve body members 10 and 11, the valve seat plate 12, and the valve body 34 may be formed as homogeneous members, as of any desired metal, or they may be formed as metal members lined with other material, as with natural or synthetic rubber. When such a lining material is used, it is desirably of hard consistency, in contrast to the relatively flexible material of the diaphragms 18 and 22.

The form and separability of the parts facilitate the application of such lining, for all lined surfaces of the body parts are readily accessible from, and close to, one or another of the openings in those body parts, and the valve seat plate lining is substantially on exterior surfaces of such plate. Moreover, all the edges of the linings are clamped in place, to hold such edges against displacement, and at the same time such edges form gaskets between the parts, as between the valve seat plate and the two main body parts.

The valve body parts 10 and 11 and the valve seat plate 12 may be assembled either in the straight-line arrangement shown in full lines in Fig. 1, or in an angular arrangement, as indicated in dotted lines in Fig. 1. In either case, the valve seat plate 12 provides a central valve opening surrounded on the upper face of the plate 12 by a flat valve seat in fixed position with respect to the body part 10. The movable valve parts and the yoke 24 may be assembled through the opening of the collar 14, and may readily be removed therethrough for replacement.

From the position of the parts shown in Fig. 1 the valve is opened by turning the handle 28, which draws the stem 30 outward and retracts the valve plug 34 from the valve seat. In such movement, the main diaphragm 20 flexes from the position shown in Fig. 1 to the position shown in Fig. 3, and the supplementary diaphragm 22 flexes from the position shown in Fig. 1 to the position shown in Fig. 3.

In the event of a leak or rupture through the primary diaphragm 20 (in any position of the valve), pressure within the valve body will be exerted on the supplementary diaphragm 22 which, with the support of its confining walls, provides a secondary seal for the valve and prevents leakage. At the same time, the deformation of the supplementary diaphragm 22 to distend it rearward raises the indicator ring 47 and projects the indicator pin 48 to its warning position, as shown in Fig. 2.

The valve seat surrounding the central opening of the valve seat plate 12 may readily be renewed, by disassembling valve body parts 10 and 11 and either reversing such plate 12 to present its opposite face as the valve seat or replacing such plate 12. Access to the head of the valve body 34 for replacement of the valve facing 46 may be obtained either by separating the valve body part 10 and plate 12 from the body part 11 or by removing the yoke 24 and its associated valve parts.

I claim as my invention:
1. A packingless valve, comprising a movable valve plug member having an axially extending operating stem, a valve casing having a portion surrounding the stem of the valve member, an annular primary sealing diaphragm sealed at its inner edge to the valve member and at its outer edge to the surrounding casing portion, a walled chamber behind the primary diaphragm, the valve stem extending through said chamber and through its outer wall, a secondary sealing diaphragm in said chamber between the primary diaphragm and the outer wall, said secondary diaphragm having a normal configuration in which it is spaced from said outer wall and being adapted to distort into supported relationship with such wall in the event of pressure leakage through the primary diaphragm, and indicator means between the secondary diaphragm and said outer wall and operable to indicate distortion of the secondary diaphragm.

2. A packingless valve, comprising a valve plug member having an axially movable stem, a casing through which the stem extends, a primary diaphragm extending between the valve stem and the casing to seal the casing against leakage along the stem, a chamber formed by the casing about the valve stem behind the primary diaphragm, a secondary sealing diaphragm extending between the stem and the casing and normally lying loosely in said chamber and spaced from an outer wall thereof, a reaction plate normally lying in a retracted position in said chamber between said secondary diaphragm and said outer wall, said secondary diaphragm being adapted to distort under pressure and move said plate to an outer position, and said chamber walls being positioned to limit the distortion of the secondary diaphragm and support it in a predetermined position of distortion, and an indicator carried by said plate and moved to an indicating position upon movement of the plate to its outer position.

References Cited in the file of this patent

UNITED STATES PATENTS

| 1,497,275 | Hench | June 10, 1924 |
| 1,947,257 | Fritz | Feb. 13, 1934 |
| 1,983,106 | Sundstrom | Dec. 4, 1934 |
| 1,992,902 | McIntosh | Feb. 26, 1935 |
| 2,002,883 | Deming | May 28, 1935 |
| 2,124,015 | Stone | July 19, 1938 |
| 2,202,735 | Johnson | May 28, 1940 |
| 2,225,675 | West | Dec. 24, 1940 |
| 2,382,235 | Lamar | Aug. 14, 1945 |
| 2,454,160 | Greene | Nov. 16, 1948 |
| 2,469,109 | Goecke | May 3, 1949 |

FOREIGN PATENTS

| 647,467 | Germany | July 5, 1937 |
| 697,658 | Germany | Oct. 18, 1940 |